United States Patent
Yoo et al.

(10) Patent No.: US 9,698,900 B2
(45) Date of Patent: Jul. 4, 2017

(54) OPTICAL NETWORK UNIT AND METHOD FOR CONTROLLING THE UNIT

(71) Applicant: ELECTRONICS AND TELECOMMUNICATIONS RESEARCH INSTITUTE, Daejeon (KR)

(72) Inventors: Hark Yoo, Gwangju (KR); Yongseok Yoo, Gwangju (KR); Geun Yong Kim, Gwangju (KR); Dongsoo Lee, Seongnam-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/142,626

(22) Filed: Apr. 29, 2016

(65) Prior Publication Data

US 2017/0026111 A1    Jan. 26, 2017

(30) Foreign Application Priority Data

Jul. 20, 2015   (KR) .................. 10-2015-0102621

(51) Int. Cl.
  *H04B 10/00* (2013.01)
  *H04B 10/03* (2013.01)
  *H04B 10/272* (2013.01)
  *H04J 14/02* (2006.01)
  *H04J 14/00* (2006.01)

(52) U.S. Cl.
  CPC ........... *H04B 10/03* (2013.01); *H04B 10/272* (2013.01); *H04J 14/0282* (2013.01); *H04B 2210/071* (2013.01)

(58) Field of Classification Search
  CPC ............ H04B 10/572; H04B 10/07957; H04B 10/0799; H04J 14/0235; H04J 14/0236; H04J 14/0249; H04J 14/025; H04J 14/0252
  See application file for complete search history.

(56) References Cited

U.S. PATENT DOCUMENTS

| | | | |
|---|---|---|---|
| 8,606,100 B2 | 12/2013 | Kim et al. | |
| 8,971,710 B2 | 3/2015 | Jeong et al. | |
| 2006/0198635 A1* | 9/2006 | Emery | H04B 10/0799 398/38 |
| 2008/0166119 A1 | 7/2008 | Ryu et al. | |
| 2015/0037035 A1* | 2/2015 | Sugawa | H04J 14/08 398/66 |

FOREIGN PATENT DOCUMENTS

| | | |
|---|---|---|
| KR | 10-0859808 B1 | 9/2008 |
| KR | 10-0893214 B1 | 4/2009 |
| KR | 10-2009-0058388 A | 6/2009 |
| KR | 10-2014-0127167 A | 11/2014 |

* cited by examiner

*Primary Examiner* — Daniel Dobson
(74) *Attorney, Agent, or Firm* — Rabin & Berdo, P.C.

(57) ABSTRACT

Disclosed herein are an optical network unit and a method for controlling the unit. In a passive optical network system, an optical transceiver of the optical network unit performs a wavelength change of an optical signal according to a wavelength setting command transferred from a media access control (MAC) unit and monitors a wavelength change state and reports the monitored wavelength change state to the MAC unit. When the wavelength malfunction occurs, the MAC unit blocks an uplink optical transmission of the optical transceiver.

20 Claims, 9 Drawing Sheets

Wavelength setting information in MCU (map table)

| Wavelength | ch1 | ch2 | ch3 | ch4 |
|---|---|---|---|---|
| Resistance | A | B | C | D |

OPTICAL NETWORK UNIT AND METHOD FOR CONTROLLING THE UNIT

CROSS-REFERENCE TO RELATED APPLICATION

This application claims priority to and the benefit of Korean Patent Application No. 10-2015-0102621 filed in the Korean Intellectual Property Office on Jul. 20, 2015, the entire contents of which are incorporated herein by reference.

BACKGROUND OF THE INVENTION (a) Field of the Invention

The present invention relates to an optical network unit and a method for controlling the unit in a hybrid passive optical network system.

(b) Description of the Related Art

With the development of optical communication technologies and a rapid increase in the demand on Internet services, fundamental researches on optical network have been conducted since the early 2000s. As a result, broadband networks, such as Fiber To The Home (FTTH) and Fiber To The Office (FTTO), have emerged and become common, in which the broadband network directly connects a base station or a central office (CO) to a subscriber using optical fibers.

Additionally, numerous researches have been recently conducted on technologies of the next generation high-speed and high-capacity optical network to cope with an explosive increase in traffic according to proliferation of mobile IP terminals, such as a smart phone or a table computer, commercialization of IPTV services, and proliferation of multimedia broadcasting/streaming services over the Internet.

As a method for efficiently providing services to more subscribers with a limited network resource, a time division multiplexing (TDM) technique and a wavelength division multiplexing (WDM) techniques have been applied to an optical subscriber network technology. In addition, many researches have been conducted on an optical network using a hybrid method to which the TDM method and the WDM method are applied together.

A hybrid type optical subscriber technology using both the TDM technique and the WDM technique are applied may meet the demand for a continued bandwidth expansion of a network and facilitate an expansion of communication capacity and the number of subscribers while providing ultra high speed communication services to more subscribers.

In international telecommunications union telecommunication (ITU-T) that is a main internal standardization organization, as a main technology of 40-gigabit-capable passive optical networks that is a 40G optical subscriber network technology, a PON technology and a point-to-point WDM technology of a time and wavelength division multiplexing scheme are selected and a standardization operation thereof has been progressed.

Like a time and wavelength division multiplexing passive optical network (TWDM-PON) system, a hybrid PON system in which various kinds of multiplexing techniques are mixed needs to be subjected to maintenance more than the existing PON system. For example, in the case of the TDM-PON system, to figure out and prevent a malfunction of optical network units (ONU), it is enough to observe a time, that is, a transmission time of allocated uplink signals in the viewpoint that each ONU observes a transmission time of an allocated uplink signal. On the other hand, in the TWDM-PON system, the TDM technique and the WDM technique are mixed, and therefore there is a need to prevent or stop the malfunction of the ONUs by figuring out the malfunction of the ONUs in consideration of the viewpoint of the time and the wavelength, in particular, the viewpoint that each ONU observes the wavelength of the allocated uplink signals. Transmitting, by a specific ONU, the uplink signal at different wavelengths from the allocated wavelength may have an adverse effect on the whole system.

In particular, the TWDM-PON system may use an ONU including a wavelength tunable light source, may not fix uplink/downlink transmitting/receiving wavelengths but change the uplink/downlink transmitting/receiving wavelengths of the ONU if necessary to balance a bandwidth load between channels, or when a total bandwidth consumption of a network is small, change some of channels to a power saving mode, and change the wavelength of the corresponding ONUs to a wavelength of different channels. Further, when abnormality of an optical distributed network (ODN) occurs, it is possible to change use wavelengths of the ONUs for protection switching. As such, when the wavelength various light source is used as an optical transmitter of the ONU, the wavelength setting malfunction occurs and thus an uplink optical signal may be output at a wavelength different from the allocated wavelength, such that the uplink transmission of other ONUs normally operated may have a disorder. Therefore, the hybrid PON system such as the TWDM-PON needs a wavelength setting monitoring function and a wavelength setting malfunction prevention function of the ONU having the wavelength tunable light source for a stable operation of the network The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an optical network unit and a method for controlling the unit having advantages of preventing a wavelength malfunction of a wavelength tunable light source in a hybrid passive optical network system.

An exemplary embodiment of the present invention provides a method for controlling an optical network unit in a passive optical network system, including: performing, by an optical transceiver of the optical network unit, a wavelength change of an optical signal in response to a wavelength setting command transferred from a media access control (MAC) unit; generating, by the optical transceiver, a wavelength threshold alarm in response to a wavelength change and transferring the generated wavelength threshold alarm to the MAC unit; determining, by the MAC unit, a wavelength malfunction based on the wavelength threshold alarm and a wavelength setting history, the wavelength setting history being history information associated with generating and transmitting the wavelength setting command; and when the wavelength malfunction occurs, the MAC unit blocks an uplink optical transmission of the optical transceiver.

The determining of the wavelength malfunction may include: determining that the wavelength change is normally performed when the wavelength threshold alarm is received after the wavelength setting command is generated and transmitted depending on the wavelength setting history;

and even though the generating and transmitting history of the wavelength setting command is not present in the wavelength setting history, when the wavelength threshold alarm is received, determining that the wavelength malfunction occurs.

The generating of the wavelength threshold alarm and the transferring of the generated wavelength threshold alarm to the MAC unit may include: monitoring the wavelength change based on a signal output from a wavelength tunable light source unit; generating the wavelength threshold alarm when a value of the signal exceeds a preset threshold; and transferring the wavelength threshold alarm to the MAC unit.

The signal output from the wavelength tunable light source unit may be a resistance of a temperature adjusting apparatus controlling a temperature of the light source and the threshold may have a value between the resistance of the temperature adjusting apparatus corresponding to the previous wavelength and the resistance of the temperature adjusting apparatus corresponding to a targeted wavelength according to the wavelength setting command.

The wavelength threshold alarm may include whether the wavelength change occurs, a wavelength before being changed, and a wavelength after being changed.

The determining of the wavelength malfunction may include: determining that the wavelength malfunction occurs, when the wavelength before being changed and the wavelength after being changed included in the wavelength change information and the wavelength threshold alarm according to the wavelength setting command are different from each other.

The method may further include: prior to the performing of the wavelength change, generating the wavelength setting command based on the wavelength setting message received by the MAC unit of the optical network unit; transferring, by the MAC unit, the wavelength setting command to the optical transceiver; and storing, by the MAC unit, history information on the generation and transmission of the wavelength setting command in the wavelength setting history.

The blocking of the uplink optical transmission of the optical transceiver by the MAC unit may include: reporting, by the MAC unit, an optical network line apparatus that the uplink transmission is blocked; transmitting, by the MAC unit, an optical transmission blocking signal to the optical transceiver; and stopping, by the optical transceiver, the uplink optical transmission.

Another embodiment of the present invention provides a method for controlling an optical network unit in a passive optical network system, including: monitoring, by an optical transceiver of the optical network unit, a signal output from a wavelength tunable light source unit; determining a wavelength malfunction based on the signal and a wavelength setting command history, the wavelength setting history being history information receiving the wavelength setting command from a media access control (MAC) unit of the optical network unit; when the wavelength malfunction occurs, reporting, by the optical transceiver, the occurrence of the wavelength malfunction to the MAC unit of the optical network unit; and blocking, by the MAC unit, an uplink optical transmission of the optical transceiver.

The determining of the wavelength malfunction may include: monitoring the wavelength change based on a signal output from a wavelength tunable light source unit; and determining that the wavelength malfunction occurs, when a value of the signal exceeds a preset threshold and there is no wavelength setting command history in the wavelength setting command history.

The signal output from the wavelength tunable light source unit may be a resistance of a temperature adjusting apparatus controlling a temperature of the light source and the threshold may have a value between the resistance of the temperature adjusting apparatus corresponding to the previous wavelength and the resistance of the temperature adjusting apparatus corresponding to a targeted wavelength to be changed.

The determining of the wavelength malfunction may include: monitoring a wavelength change based on a signal output from a wavelength tunable light source unit, the signal being the resistance of the temperature adjusting apparatus controlling the temperature of the light source; and determining that the wavelength malfunction occurs, when the resistance output from the wavelength change variable unit is different from the wavelength change information according to the wavelength setting command.

The blocking of the uplink optical transmission of the optical transceiver by the MAC unit may include: reporting, by the MAC unit, an optical network line apparatus that the uplink transmission is blocked; transmitting, by the MAC unit, an optical transmission blocking signal to the optical transceiver; and stopping, by the optical transceiver, the uplink optical transmission.

Yet another embodiment of the present invention provides an optical network unit of a passive optical network system, including: media access control (MAC) units generating a wavelength setting command based on a wavelength setting message received from an optical network line apparatus; and an optical transceiver performing a wavelength change of an optical signal according to the wavelength setting command transferred through a channel set between MAC units and when a wavelength malfunction occurs, stopping an uplink optical transmission according to an optical transmission blocking signal applied from the MAC unit through a first interface other than the channel, in which the optical transceiver includes: a light source generating an optical signal; a temperature adjuster controlling the temperature of the light source to change the wavelength of the optical signal; a driver driving the light source and stopping the driving of the light source depending on the light transmission blocking signal; and a controller setting a wavelength setting parameter according to the wavelength setting command, controlling the temperature adjuster depending on the wavelength setting parameter to change the wavelength of the optical signal, and reporting a wavelength change state of the optical signal to the MAC unit.

The wavelength change state may be a wavelength threshold alarm and the controller may monitor a resistance output from the temperature adjuster and when the resistance exceeds a preset threshold, generate the wavelength threshold alarm and transfer the generated wavelength threshold alarm to the MAC unit.

The MAC unit may include: a command generator generating a wavelength setting command for the wavelength to be set and transferring the generated wavelength setting command to the optical transceiver; a wavelength malfunction determiner determining a wavelength malfunction of the optical transceiver based on the wavelength threshold alarm, and a wavelength setting history transferred from the optical transceiver, the wavelength setting history being history information associated with generating and transmitting the wavelength setting command; and an uplink transmission blocker generating an uplink transmission block signal and transferring the generated uplink transmission block signal to the optical transceiver through the first interface when the wavelength malfunction occurs in the optical transceiver.

The wavelength change state may be a wavelength malfunction occurrence report, and the controller may monitor a resistance output from the temperature adjuster and determine a wavelength malfunction based on the monitored result of the resistance and the wavelength setting command history, and when the wavelength malfunction occurs, transfer a report of the wavelength malfunction occurrence to the MAC unit through a second interface other than the channel, the wavelength setting history being history information receiving the wavelength setting command from the MAC unit.

The controller may determine that the wavelength malfunction occurs, when the resistance exceeds a preset threshold and there is no wavelength setting command history in the wavelength setting command history.

The MAC unit may include: a command generator generating a wavelength setting command for the wavelength to be set and transferring the generated wavelength setting command to the optical transceiver; and an uplink transmission blocker generating an uplink transmission blocking signal and transferring the generated uplink transmission blocking signal to the optical transceiver through the first interface if the wavelength malfunction occurrence report is received from the optical transceiver through the second interface.

The MAC unit may further include a block informer transmitting information informing that the uplink optical transmission is blocked as a message to the optical network line apparatus, prior to transmitting the optical transmission blocking signal to the optical transceiver.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification, unless explicitly described to the contrary, "comprising" any components will be understood to imply the inclusion of other elements rather than the exclusion of any other elements.

Hereinafter, an optical network unit and a method for controlling the unit according to an exemplary embodiment of the present invention will be described with reference to the accompanying drawings.

In a hybrid passive optical network (PON) like a time and wavelength division multiplexing passive optical network (TWDM-PON) system, an optical network unit (ONU) including a wavelength tunable function is used. When the wavelength tunable light source is used as an optical transmitter of the ONU, a malfunction in wavelength setting may occur.

Figure 1A:
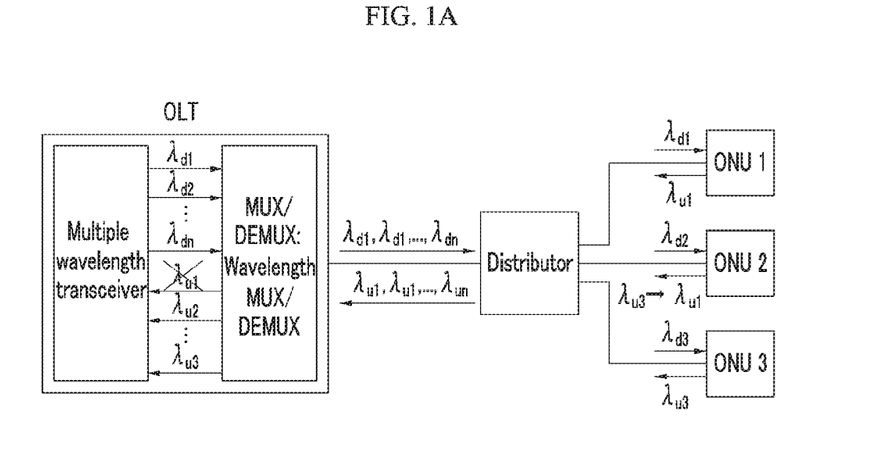
FIGS. 1A and 1B are exemplified diagrams illustrating a wavelength malfunction in an optical network.
Figure 1B:
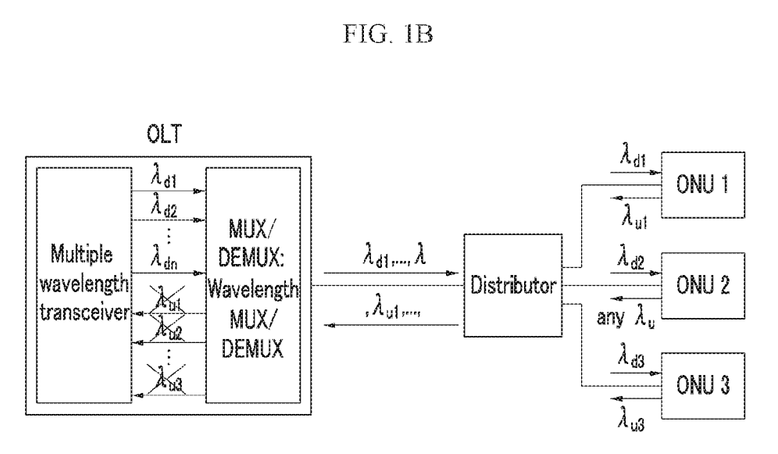

FIGS. 1A and 1B are exemplified diagrams illustrating a wavelength malfunction in an optical network.

In the optical network, that is, the ONU of the TWDM-PON, as illustrated in FIG. 1A, a wavelength is fixed to a specific wavelength $\lambda_{u1}$ and thus may be malfunctional or as illustrated in FIG. 1B, the wavelength is continuously changed to any wavelength $\lambda_{ux}$ (or $\lambda_{un}$) and thus may be malfunctional. In this case, due to the wavelength malfunction, the ONU may output an uplink optical signal with a wavelength different from an allocated wavelength, which may lead to a disorder in an uplink transmission of other ONUs normally operated.

The optical network unit according to the exemplary embodiment of the present invention performs a wavelength setting monitoring function for preventing the wavelength malfunction and perform an optical output blocking function.

Figure 2:
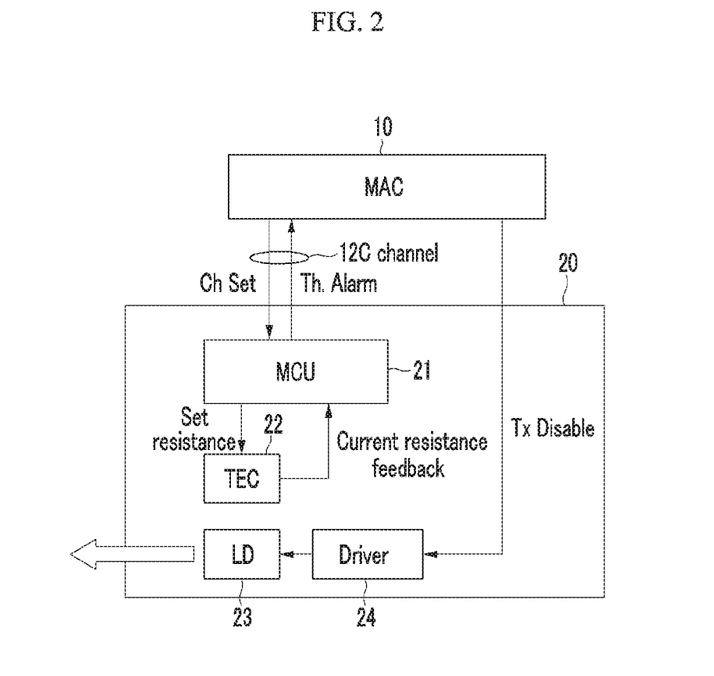
FIG. 2 is a diagram illustrating a structure of an optical network unit according to an exemplary embodiment of the present invention.

FIG. 2 is a diagram illustrating a structure of an optical network unit according to an exemplary embodiment of the present invention.

As illustrated in FIG. 2, the optical network unit according to the exemplary embodiment of the present invention, that is, an ONU 100 includes a media access control (MAC) unit 10 and an optical transceiver 20 as illustrated in FIG. 2. A plurality of channels are formed between the MAC unit 10 and the optical transceiver 20 and a wavelength setting command and wavelength setting state information are transferred through the channels. The plurality of channels are configured of an inter-IC (I2C) channel. In addition, a Tx Disable pin interface is formed between the MAC unit 10 and the optical transceiver 20.

The MAC unit 10 generates an uplink transmission frame and a downlink transmission frame and manages a state of the ONU. This will be described below in more detail.

The optical transceiver 20 includes a controller (microcontroller unit (MCU)) 21, a temperature adjuster 22, a light source 23, and a driver 24.

The MCU 21 performs wavelength setting, change, and monitoring of the light source. The MCU 21 determines a parameter for setting a wavelength (wavelength setting parameter) based on a wavelength setting command received from the MAC unit 10 and controls the temperature adjuster 22 based on the determined wavelength setting parameter. The MCU 21 may write and manage the wavelength setting parameter and the wavelength setting parameter may include a resistance of the temperature adjuster 22.

The wavelength setting parameter may be managed by being stored in a wavelength setting information table.

Figure 3:
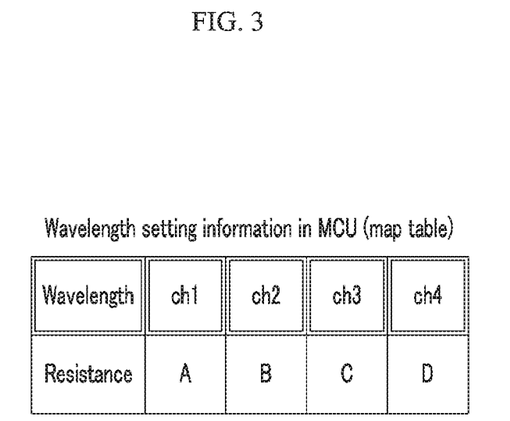
FIG. 3 is an exemplified diagram illustrating a wavelength setting information table according to an exemplary embodiment of the present invention.

FIG. 3 is an exemplified diagram illustrating a wavelength setting information table according to an exemplary embodiment of the present invention.

As illustrated in FIG. 3, when the available uplink wavelength is, for example, four, the wavelength setting parameters managed by the MCU are stored in the wavelength setting information table. That is, resistances A, B, C, and D of the temperature adjuster 22 are stored for each wavelength ch1, ch2, ch3, and ch4.

When the optical transceiver is manufactured, the wavelength setting table may be generated by a calibration process of a manufacturer or when the ONU is first started, may be generated by storing the setting parameters for each wavelength channel by the calibration process with an optical line terminal apparatus, that is, an optical line terminal (OLT).

Further, the MCU 21 may perform a process of comparing a resistance with a preset threshold while monitoring a resistance provided from the temperature adjuster 22, thereby performing a wavelength threshold alarm. In this case, the wavelength threshold alarm may include information such as whether the wavelength change occurs, a wavelength before being changed, and a wavelength after being changed.

The light source 23 outputs an optical signal and may be configured of a laser diode (LD). The light source 23 is a wavelength tunable light source and may be configured of a wavelength tunable laser diode having a wavelength varying depending on temperature.

The temperature adjuster 22 may be configured of a thermo-electric cooler (TEC) and perform the temperature adjustment for the wavelength change. Further, a current resistance depending on temperature is reported to the MCU 21. The temperature adjuster 22 and the light source 23 may be collectively referred to as "wavelength tunable light source unit". The wavelength tunable light source unit changes the wavelength of the optical signal output according to the control of the MCU 21 based on the wavelength setting command of the MAC unit 10 and transmits the wavelength change state information (current resistance depending on temperature) to the MCU 21 and the MAC unit 10.

The driver 24 drives the light source 23. The driver 24 drives or does not drive the light source 23 according to signal Tx Disable transferred from the MAC unit 10. Meanwhile, the driver 24 may be connected to the MAC unit 10 through a separate interface, that is, a Tx Disable pin interface to receive a signal.

Although not illustrated in FIG. 2, the ONU 100 may further include a central processing unit (CPU) responsible for a protocol operation, a memory for storing an uplink packet, a subscriber interface transmitting/receiving traffic from a subscriber. In particular, FIG. 2 illustrates only a portion responsible for uplink transmission among components of the optical transceiver 20 and does not illustrate a portion receiving the downlink frame. However, these portions are known to those skilled in the art and therefore, the detailed description thereof will be omitted.

Meanwhile, the MAC unit 10 has the following structure.

Figure 4:
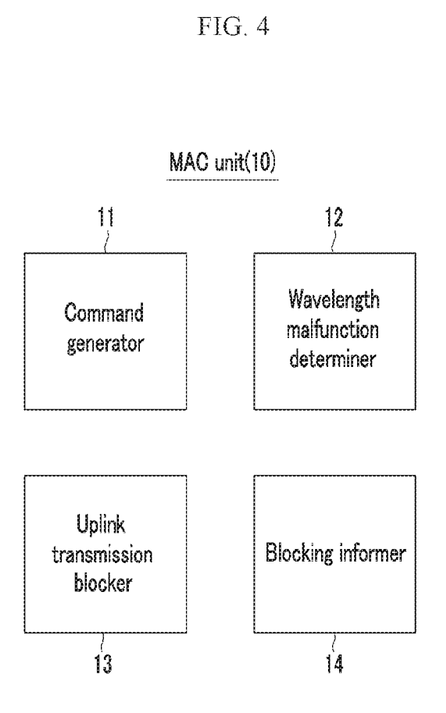
FIG. 4 is a diagram illustrating a structure of an MAC unit according to an exemplary embodiment of the present invention.

FIG. 4 is a diagram illustrating a structure of the MAC unit according to an exemplary embodiment of the present invention.

As illustrated in FIG. 4, the MAC unit includes a command generator 11, a wavelength malfunction determiner 12, an upward transmission blocker 13, and a blocking informer 14.

The command generator 11 generates the wavelength setting command for a wavelength to be set and transmits the generated wavelength setting command to the optical transceiver 20.

The wavelength malfunction determiner 12 determines the wavelength malfunction of the optical transceiver 20 based on a wavelength threshold alarm and a wavelength setting history transmitted from the optical transceiver 20. Here, the wavelength setting history is history information associated with generating and transmitting the wavelength setting command. When generating and transmitting the wavelength setting command depending on the wavelength setting history and then receiving the wavelength threshold alarm, the wavelength malfunction determiner 12 determines that the wavelength change is normally performed. On the other hand, even though the wavelength threshold alarm is received even when the generating and transmitting history of the wavelength setting command is not present in the wavelength setting history, when the wavelength threshold alarm is received, it is determined that the wavelength malfunction occurs in the optical transceiver. In addition, even when the wavelength setting command is generated and transmitted and then the wavelength threshold alarm does not arrives for a predetermined time, it may be determined that the wavelength malfunction occurs. Even when the wavelength threshold alarm different from the wavelength change information according to the wavelength setting command occurs, it may be determined that the wavelength malfunction occurs. In detail, the wavelength change information sets a change from ch1 to ch2 and when the wavelength threshold alarm includes change information from ch1 to ch3, it may be determined that the wavelength malfunction occurs in the optical transceiver.

When the wavelength malfunction occurs in the optical transceiver, the uplink transmission blocker 13 transmits the uplink transmission blocking signal to the optical transceiver 20. That is, the uplink transmission blocking signal is transmitted to the driver 24 of the optical transceiver 20 through a separate interface and thus the uplink optical transmission of the optical transceiver stops.

The blocking informer 14 reports the uplink optical transmission blocking of the optical transceiver to the uplink. Prior to transmitting the uplink transmission blocking signal to the driver 24 of the optical transceiver 20, the information informing the blocking of the uplink optical transmission may be transmitted to the OLT by being included in the corresponding field of the uplink frame or through a separate message.

Meanwhile, the MAC unit 10 may not include the wavelength malfunction determiner 12. In this case, the uplink transmission blocker 13 may transmit the uplink transmission blocking signal to the optical transceiver 20 based on the wavelength malfunction occurrence report transmitted through the optical transceiver 20 and a separate pin interface.

When the MAC unit 10 is implemented in a form in which it does not include the wavelength malfunction determiner 12, the MCU 21 of the optical transceiver 20 may perform the operation corresponding to the wavelength malfunction determiner and report whether the wavelength malfunction due to the operation performance occurs to the MAC unit 10.

Next, a method for controlling an optical network unit according to an exemplary embodiment of the present invention will be described based on the above structure.

Figure 5:
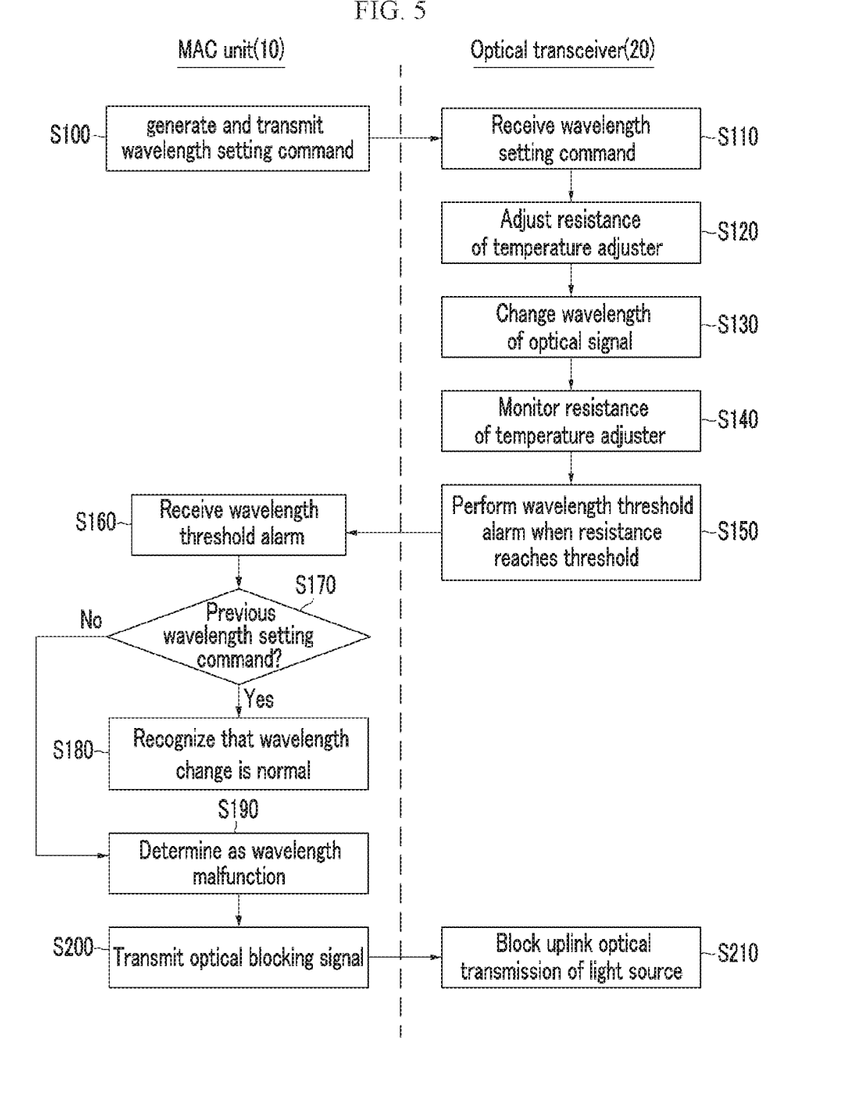
FIG. 5 is a flow chart of a method for controlling an optical network unit according to an exemplary embodiment of the present invention.

FIG. 5 is a flow chart of a method for controlling an optical network unit according to an exemplary embodiment of the present invention.

First, the MAC unit 10 receives the downlink frame transmitted from the OLT through the optical transceiver 20 and receives a physical layer operations administration and maintenance (PLOAM) message (referred to as a wavelength setting message) including the wavelength setting information in the downlink frame.

The MAC unit 10 generates the wavelength setting command based on the wavelength setting information included in the received PLOAM message. Further, the wavelength setting command (CH Set in FIG. 2) is transmitted to the optical transceiver 20 through the channel such as I2C (S100). The wavelength setting command includes the wavelength information to be set. Here, the MAC unit 10 may transmit the wavelength setting command and then store the history information on the wavelength setting command generation and transmission in the wavelength setting history.

The MCU 21 of the optical transceiver 20 receives the wavelength setting command and controls the setting parameter of the temperature adjuster 22, that is, the resistance based on the wavelength information included in the wavelength setting command (S110 and S120).

The temperature adjuster 22 has temperature varying depending on the setting parameter and therefore the wavelength of the optical signal output from the light source 23 is changed (S130). In this case, the temperature adjuster 22 outputs the change in resistance to the MCU 21 in real time and the MCU 21 monitors whether the wavelength setting is properly performed based on the resistance of the temperature adjuster 22 (S140).

The MCU 21 may perform the wavelength threshold alarm process while monitoring the resistance provided from the temperature adjuster 22.

Figure 6:
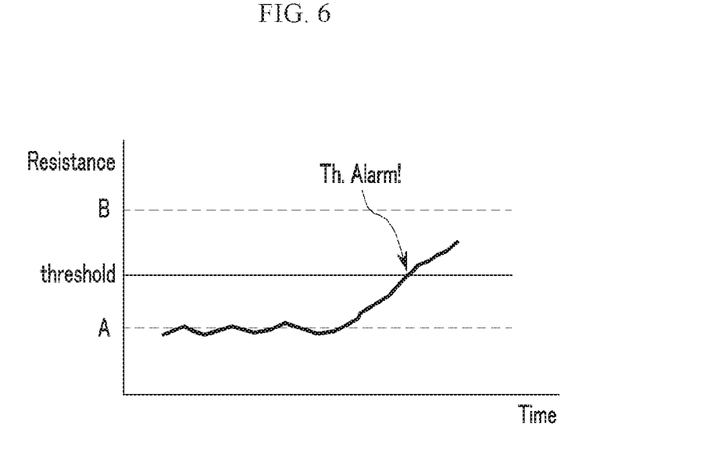
FIG. 6 is an exemplified diagram illustrating a wavelength threshold alarm process according to an exemplary embodiment of the present invention.

FIG. 6 is an exemplified diagram illustrating a wavelength threshold alarm process according to an exemplary embodiment of the present invention.

For example, the change in resistance appearing during the process of performing the wavelength change from the state in which the currently set wavelength is Ch1 to Ch2 according to the wavelength setting command is illustrated in FIG. 6. In this case, the MCU 21 performs the wavelength threshold alarm when the current resistance provided from the temperature adjuster 22 exceeds the preset threshold between resistances for each wavelength. That is, when a value between a resistance A of the wavelength Ch1 and a resistance B of the wavelength Ch2 is set as a threshold in advance and the current resistance provided from the temperature adjuster 22 reaches a threshold in the state in which it is changed from A to B as illustrated in FIG. 6, the MCU 21 generates a threshold alarm representing that it exceeds the threshold to report it to the MAC unit 10 through the 120 channel (S150).

The MAC unit 10 may confirm that the current wavelength is changed from the Ch1 to the Ch2 based on the threshold alarm (S160). The MAC unit 20 may confirm whether the wavelength setting of the optical transceiver is normally performed or whether the wavelength malfunction occurs, based on the wavelength setting command transmitted to the optical transceiver 20 and the threshold alarm received from the MCU 21 of the optical transceiver 20.

In detail, when the wavelength setting command is generated and then the threshold alarm is received, the MAC unit 10 determines that the wavelength change according to the wavelength setting command is normally performed (S170 and S180). In addition, even when the wavelength setting command is generated and then the wavelength threshold alarm does not arrives for a predetermined time, it may be determined that the wavelength malfunction occurs. Further, even when the wavelength threshold alarm different from the wavelength change information according to the wavelength setting command occurs, it may be determined that the wavelength malfunction occurs.

On the other hand, even though the wavelength setting command is not transmitted, when the threshold alarm is received from the optical transceiver 20, it is determined that the wavelength malfunction due to the problem of the optical transceiver 20 occurs (S190).

If it is determined that the wavelength malfunction occurs, the MAC unit 10 blocks the uplink optical transmission of the optical transceiver 20. The MAC unit 10 transmits the optical transmission blocking signal through the separate interface Tx Disable interface connected to the driver 24 of the optical transceiver 20 (S200). When the optical transmission blocking signal is received from the MAC unit 10, the driver 24 stops the driving of the light source 23 to block the uplink optical transmission of the optical transceiver 20 (S210). By this, it is possible to prevent a disorder from occurring in the uplink transmission of other normal ONUs due to the wavelength malfunction.

In this case, the problem of the ONU occurs before the uplink transmission blocking of the optical transceiver, and thus the MAC unit 10 may perform the process of informing that the uplink transmission is blocked.

In the case of the TWDM-PON, the information informing that the uplink transmission is blocked may be transferred to the uplink by using a dying gasp field of the uplink frame. In the OLT receiving the uplink frame, it may be determined that the uplink transmission of the corresponding ONU is blocked due to the problem of the ONU, not the problem of the optical cable or the problem of the OLT receiver.

Meanwhile, unlike the exemplary embodiment of the present invention as described above, the optical transceiver may perform whether the wavelength malfunction occurs.

Figure 7:
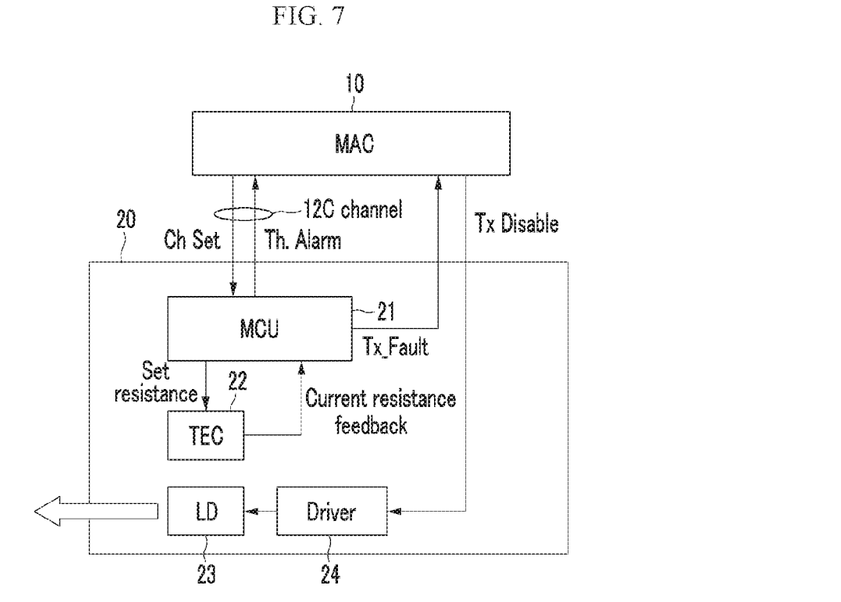
FIG. 7 is a diagram illustrating an operation concept of an optical network unit according to another exemplary embodiment of the present invention.
Figure 8:
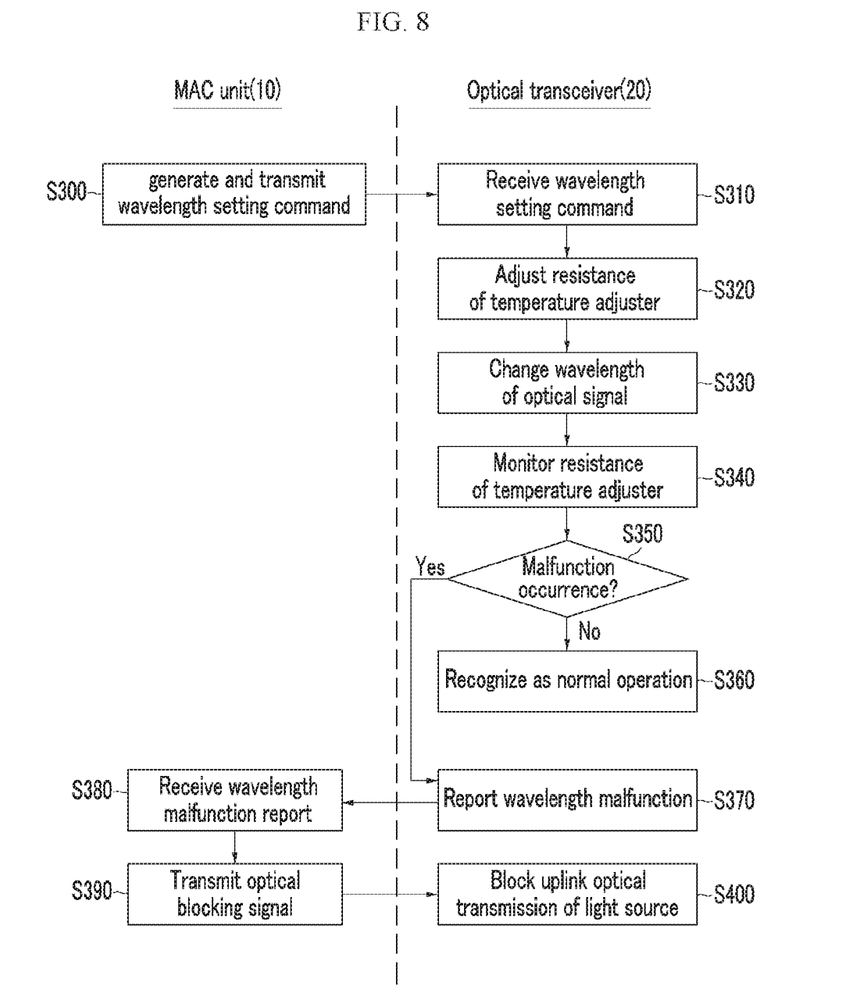
FIG. 8 is a flow chart of a method for controlling an optical network unit according to another exemplary embodiment of the present invention.

FIG. 7 is a diagram illustrating an operation concept of an optical network unit according to another exemplary embodiment of the present invention and FIG. 8 is a flow chart of a method for controlling an optical network unit according to another exemplary embodiment of the present invention.

According to another exemplary embodiment of the present invention, as illustrated in FIG. 7, the MCU 21 receiving the wavelength setting command from the MAC unit 10 may confirm whether the wavelength setting is performed properly based on the parameter values of the wavelength setting table and the current resistance received from the temperature controller 22. The MCU 21 may determine whether the wavelength malfunction occurs and report the determined result to the MCU unit 10, based on the confirmation process. In this case, the MCU 21 may inform the MAC unit 10 of the wavelength malfunction in real time through a separate external pin interface TX Fault, not the 120 channel. The MAC unit 10 blocks the uplink optical transmission of the optical transceiver 20 according to the wavelength malfunction report of the MCU 21.

Describing the operation of the optical network unit 10 according to another exemplary embodiment of the present invention, as illustrated in FIG. 8, similar to the exemplary embodiment of the present invention, the MCU 21 of the optical transceiver 20 controls the resistance of the temperature adjuster 22 according to the wavelength setting command from the MAC unit 10 and then monitors the change in the resistance output from the temperature adjuster 22 (S300 to S340).

The MCU 21 determines whether the wavelength malfunction occurs without performing the wavelength threshold alarm process while monitoring the resistance provided from the temperature adjuster 22 (S350 and S360). In this case, like the above-mentioned exemplary embodiment, even though the resistance of the temperature adjuster 22 is not adjusted, when the resistance output from the temperature adjuster 22 exceeds the preset threshold while being changed, the MCU 21 may be determined that the wavelength malfunction occurs. That is, as illustrated in FIG. 6, in the state in which the resistance of the temperature adjuster 22 is set to be the resistance A depending on the current wavelength Ch1 and thus is not changed, when the value of the resistance output from the temperature adjuster 22 reaches the preset threshold while the resistance output from the temperature adjuster 22 being changed to the value between A and the resistance B of the wavelength Ch2, it is determined that the wavelength malfunction occurs. For this purpose, the MCU 21 may store the wavelength setting command provided from the MAC unit 10. For convenience of explanation, the history information on the stored wavelength setting command may be called "wavelength setting command history"

Next, when the change in the resistance output from the temperature adjuster 22 occurs above the threshold, if the wavelength setting command is stored in the wavelength setting command history, it is determined that the wavelength malfunction does not occur and if the wavelength setting command is not stored in the wavelength setting command history, it is determined that the wavelength malfunction occurs. In addition, even when the wavelength setting command is received and then the change in the resistance corresponding to the wavelength change is not sensed for a predetermined time, it may be determined that the wavelength malfunction occurs. Further, when the resistance different from the wavelength change information according to the wavelength setting command is output, that is, even when the wavelength change information sets the change from ch1 to ch2 and the resistance reaches the threshold changed from the ch1 to the ch3 via the ch2, it may be determined that the wavelength malfunction occurs.

If the wavelength malfunction occurs, the MCU 21 reports the wavelength malfunction to the MAC unit 10 through a separate external pin interface TX Fault (S370).

Next, the MAC unit 10 transmits the optical transmission blocking signal to the driver 24 of the optical transceiver 20 according to the wavelength malfunction report of the MCU 21 (S380 and S390). When the optical transmission blocking signal is received from the MAC unit 10, the driver 24 stops the driving of the light source 23 to block the uplink optical transmission of the optical transceiver 20 (S400).

Of course, even in this case, the problem of the ONU occurs before the uplink transmission blocking of the optical transceiver, and thus the MAC unit 10 may perform the process of informing the OLT that the uplink transmission is blocked.

According to the exemplary embodiment of the present invention, the MCU of the optical transceiver determines whether the wavelength malfunction occurs by itself to monitor whether the wavelength change is made based on the information transmitted through an MAC additional 120 channel, thereby reducing a time delay occurring during the process of determining whether the wavelength malfunction occurs based on the monitored result.

According to an exemplary embodiment of the present invention, it is possible to prevent the wavelength malfunction by monitoring the wavelength of the wavelength tunable light source of the ONU in the hybrid passive optical system including the wavelength tunable ONU.

Further, when the wavelength malfunction occurs, it is possible to minimize the occurrence of the disorder in the uplink transmission of other operating ONUs by blocking the optical output.

The exemplary embodiments of the present invention are not implemented only by the apparatus and/or method as described above, but may be implemented by programs realizing the functions corresponding to the configuration of the exemplary embodiments of the present invention or a recording medium recorded with the programs, which may be readily implemented by a person having ordinary skill in the art to which the present invention pertains from the description of the foregoing exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for controlling an optical network unit in a passive optical network system, comprising:
    performing, by an optical transceiver of the optical network unit, a wavelength change of an optical signal in response to a wavelength setting command transferred from a media access control (MAC) unit;
    generating, by the optical transceiver, a wavelength threshold alarm in response to a wavelength change and transferring the generated wavelength threshold alarm to the MAC unit;
    determining, by the MAC unit, a wavelength malfunction based on the wavelength threshold alarm and a wavelength setting history, the wavelength setting history being history information associated with generating and transmitting the wavelength setting command; and
    when the wavelength malfunction occurs, the MAC unit blocks an uplink optical transmission of the optical transceiver.

2. The method of claim 1, wherein:
    the determining of the wavelength malfunction includes:
    determining that the wavelength change is normally performed when the wavelength threshold alarm is received after the wavelength setting command is generated and transmitted depending on the wavelength setting history; and
    even though the generating and transmitting history of the wavelength setting command is not present in the wavelength setting history, when the wavelength threshold alarm is received, determining that the wavelength malfunction occurs.

3. The method of claim 1, wherein:
    the generating of the wavelength threshold alarm and the transferring of the generated wavelength threshold alarm to the MAC unit includes:
    monitoring the wavelength change based on a signal output from a wavelength tunable light source unit;

generating the wavelength threshold alarm when a value of the signal exceeds a preset threshold; and
transferring the wavelength threshold alarm to the MAC unit.

4. The method of claim 3, wherein:
the signal output from the wavelength tunable light source unit is a resistance of a temperature adjusting apparatus controlling a temperature of the light source and the threshold has a value between the resistance of the temperature adjusting apparatus corresponding to the previous wavelength and the resistance of the temperature adjusting apparatus corresponding to a targeted wavelength according to the wavelength setting command.

5. The method of claim 3, wherein:
the wavelength threshold alarm includes whether the wavelength change occurs, a wavelength before being changed, and a wavelength after being changed.

6. The method of claim 5, wherein:
the determining of the wavelength malfunction includes:
determining that the wavelength malfunction occurs, when the wavelength before being changed and the wavelength after being changed included in the wavelength change information and the wavelength threshold alarm according to the wavelength setting command are different from each other.

7. The method of claim 1, further comprising:
prior to the performing of the wavelength change,
generating the wavelength setting command based on the wavelength setting message received by the MAC unit of the optical network unit;
transferring, by the MAC unit, the wavelength setting command to the optical transceiver; and
storing, by the MAC unit, history information on the generation and transmission of the wavelength setting command in the wavelength setting history.

8. The method of claim 1, wherein:
the blocking of the uplink optical transmission of the optical transceiver by the MAC unit includes:
reporting, by the MAC unit, an optical network line apparatus that the uplink transmission is blocked;
transmitting, by the MAC unit, an optical transmission blocking signal to the optical transceiver; and
stopping, by the optical transceiver, the uplink optical transmission.

9. A method for controlling an optical network unit in a passive optical network system, comprising:
monitoring, by an optical transceiver of the optical network unit, a signal output from a wavelength tunable light source unit;
determining a wavelength malfunction based on the signal and a wavelength setting command history, the wavelength setting history being history information receiving the wavelength setting command from a media access control (MAC) unit of the optical network unit;
when the wavelength malfunction occurs, reporting, by the optical transceiver, the occurrence of the wavelength malfunction to the MAC unit of the optical network unit; and
blocking, by the MAC unit, an uplink optical transmission of the optical transceiver.

10. The method of claim 9, wherein:
the determining of the wavelength malfunction includes:
monitoring the wavelength change based on a signal output from a wavelength tunable light source unit; and
determining that the wavelength malfunction occurs, when a value of the signal exceeds a preset threshold and there is no wavelength setting command history in the wavelength setting command history.

11. The method of claim 9, wherein:
the signal output from the wavelength tunable light source unit is a resistance of a temperature adjusting apparatus controlling a temperature of the light source and the threshold has a value between the resistance of the temperature adjusting apparatus corresponding to the previous wavelength and the resistance of the temperature adjusting apparatus corresponding to a targeted wavelength to be changed.

12. The method of claim 11, wherein:
the determining of the wavelength malfunction includes:
monitoring a wavelength change based on a signal output from a wavelength tunable light source unit, the signal being the resistance of the temperature adjusting apparatus controlling the temperature of the light source; and
determining that the wavelength malfunction occurs, when the resistance output from the wavelength change variable unit is different from the wavelength change information according to the wavelength setting command.

13. The method of claim 9, wherein:
the blocking of the uplink optical transmission of the optical transceiver by the MAC unit includes:
reporting, by the MAC unit, an optical network line apparatus that the uplink transmission is blocked;
transmitting, by the MAC unit, an optical transmission blocking signal to the optical transceiver; and
stopping, by the optical transceiver, the uplink optical transmission.

14. An optical network unit of a passive optical network system, comprising:
media access control (MAC) units generating a wavelength setting command based on a wavelength setting message received from an optical network line apparatus; and
an optical transceiver performing a wavelength change of an optical signal according to the wavelength setting command transferred through a channel set between MAC units and when a wavelength malfunction occurs, stopping an uplink optical transmission according to an optical transmission blocking signal applied from the MAC unit through a first interface other than the channel,
wherein the optical transceiver includes:
a light source generating an optical signal;
a temperature adjuster controlling the temperature of the light source to change the wavelength of the optical signal;
a driver driving the light source and stopping the driving of the light source depending on the light transmission blocking signal; and
a controller setting a wavelength setting parameter according to the wavelength setting command, controlling the temperature adjuster depending on the wavelength setting parameter to change the wavelength of the optical signal, and reporting a wavelength change state of the optical signal to the MAC unit.

15. The optical network unit of claim 14, wherein:
the wavelength change state is a wavelength threshold alarm and the controller monitors a resistance output from the temperature adjuster and when the resistance exceeds a preset threshold, generates the wavelength threshold alarm and transfers the generated wavelength threshold alarm to the MAC unit.

16. The optical network unit of claim 15, wherein:
the MAC unit includes:
a command generator generating a wavelength setting command for the wavelength to be set and transferring the generated wavelength setting command to the optical transceiver;
a wavelength malfunction determiner determining a wavelength malfunction of the optical transceiver based on the wavelength threshold alarm, and a wavelength setting history transferred from the optical transceiver, the wavelength setting history being history information associated with generating and transmitting the wavelength setting command; and
an uplink transmission blocker generating an uplink transmission block signal and transferring the generated uplink transmission block signal to the optical transceiver through the first interface when the wavelength malfunction occurs in the optical transceiver.

17. The optical network unit of claim 15, wherein:
the wavelength change state is a wavelength malfunction occurrence report, and
the controller monitors a resistance output from the temperature adjuster and determines a wavelength malfunction based on the monitored result of the resistance and the wavelength setting command history, and when the wavelength malfunction occurs, transfers a report of the wavelength malfunction occurrence to the MAC unit through a second interface other than the channel, the wavelength setting history being history information receiving the wavelength setting command from the MAC unit.

18. The optical network unit of claim 17, wherein:
the controller determines that the wavelength malfunction occurs, when the resistance exceeds a preset threshold and there is no wavelength setting command history in the wavelength setting command history.

19. The optical network unit of claim 17, wherein:
the MAC unit includes:
a command generator generating a wavelength setting command for the wavelength to be set and transferring the generated wavelength setting command to the optical transceiver; and
an uplink transmission blocker generating an uplink transmission blocking signal and transferring the generated uplink transmission blocking signal to the optical transceiver through the first interface if the wavelength malfunction occurrence report is received from the optical transceiver through the second interface.

20. The optical network unit of claim 14, wherein:
the MAC unit
further includes a block informer transmitting information informing that the uplink optical transmission is blocked as a message to the optical network line apparatus, prior to transmitting the optical transmission blocking signal to the optical transceiver.

\* \* \* \* \*